(12) United States Patent
Xu et al.

(10) Patent No.: US 10,712,626 B2
(45) Date of Patent: Jul. 14, 2020

(54) DISPLAY DEVICE

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Yuanjie Xu, Beijing (CN); Pengcheng Zang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 202 days.

(21) Appl. No.: 15/736,746

(22) PCT Filed: Mar. 13, 2017

(86) PCT No.: PCT/CN2017/076442
§ 371 (c)(1),
(2) Date: Dec. 14, 2017

(87) PCT Pub. No.: WO2018/076593
PCT Pub. Date: May 3, 2018

(65) Prior Publication Data
US 2018/0356657 A1    Dec. 13, 2018

(30) Foreign Application Priority Data

Oct. 28, 2016    (CN) .......................... 2016 1 0970742

(51) Int. Cl.
*G02F 1/137*    (2006.01)
*G02F 1/1335*    (2006.01)
(Continued)

(52) U.S. Cl.
CPC ........... *G02F 1/137* (2013.01); *G02B 6/0055* (2013.01); *G02F 1/133345* (2013.01);
(Continued)

(58) Field of Classification Search
None
See application file for complete search history.

(56) References Cited

U.S. PATENT DOCUMENTS 5,493,430 A * 2/1996 Lu ....................... G02F 1/13718
349/106
2008/0158449 A1 * 7/2008 Daverman ........ G02F 1/133345
349/33

(Continued)

FOREIGN PATENT DOCUMENTS

CN    101201523 A    6/2008
CN    102301274 A    12/2011
(Continued)

OTHER PUBLICATIONS

Chinese Search Report, for Chinese Patent Application No. 201610970742.6, dated Feb. 16, 2017, 8 pages.
(Continued)

*Primary Examiner* — Ryan Crockett
(74) *Attorney, Agent, or Firm* — Kinney & Lange, P.A.

(57) ABSTRACT

The present disclosure relates to a display device including a first electrode and a second electrode which are disposed oppositely and are configured to shift a bright state or a dark state of an pixel unit by changing an electric field applied between the first electrode and the second electrode; a reflection member configured to reflect an incident light toward a light-emitting side of the display device; and a reflection compensation member disposed below the reflection member in a direction of the incident light to compensate a light reflection efficiency of the reflection member,
(Continued)

wherein the light reflection efficiency of the reflection compensation member is set to be larger when the pixel unit is in the bright state than that when the pixel unit is in the dark state.

15 Claims, 4 Drawing Sheets

(51) Int. Cl.

| | | |
|---|---|---|
| G02F 1/1523 | (2019.01) | |
| G02F 1/1343 | (2006.01) | |
| G02F 1/155 | (2006.01) | |
| G02F 1/1503 | (2019.01) | |
| G02F 1/19 | (2019.01) | |
| G02F 1/157 | (2006.01) | |
| G02F 1/167 | (2019.01) | |
| G02F 1/1516 | (2019.01) | |
| G02F 1/1676 | (2019.01) | |
| G02F 1/1333 | (2006.01) | |
| F21V 8/00 | (2006.01) | |

(52) U.S. Cl.
CPC .. *G02F 1/133553* (2013.01); *G02F 1/134309* (2013.01); *G02F 1/1503* (2019.01); *G02F 1/155* (2013.01); *G02F 1/157* (2013.01); *G02F 1/1523* (2013.01); *G02F 1/19* (2013.01); *G02F 1/15165* (2019.01); *G02F 1/167* (2013.01); *G02F 1/1676* (2019.01); *G02F 2201/121* (2013.01); *G02F 2201/123* (2013.01); *G02F 2201/44* (2013.01); *G02F 2203/02* (2013.01); *G02F 2203/09* (2013.01)

(56) References Cited

U.S. PATENT DOCUMENTS

| | | | |
|---|---|---|---|
| 2010/0172016 A1* | 7/2010 | Park | G02F 1/167 359/296 |
| 2011/0261301 A1 | 10/2011 | Noh et al. | |
| 2016/0011482 A1* | 1/2016 | Danine | B60R 1/088 359/268 |
| 2016/0349592 A1* | 12/2016 | Goulding | G02F 1/167 |
| 2020/0004098 A1* | 1/2020 | Harris | G02B 5/201 |

FOREIGN PATENT DOCUMENTS

| | | | |
|---|---|---|---|
| CN | 102436109 A | | 5/2012 |
| CN | 2012141584 A | | 7/2012 |
| CN | 102944952 A | | 2/2013 |
| CN | 103529615 A | | 1/2014 |
| CN | 103941468 A | | 7/2014 |
| CN | 104216177 | * | 12/2014 |
| CN | 104216177 A | | 12/2014 |
| CN | 104749837 A | | 7/2015 |
| CN | 105579900 A | | 5/2016 |
| CN | 105940344 A | | 9/2016 |
| CN | 106292092 A | | 1/2017 |
| JP | H11160704 A | | 6/1999 |
| JP | 2009265270 A | | 11/2009 |

OTHER PUBLICATIONS

First Chinese Office Action, for Chinese Patent Application No. 201610970742.6, dated Apr. 25, 2017, 13 pages.

Second Chinese Office Action, for Chinese Patent Application No. 201610970742.6, dated Jul. 26, 2017, 12 pages.

International Search Report & Written Opinion, for PCT Patent Application No. PCT/CN2017/076442, dated Aug. 7, 2017, 18 pages.

* cited by examiner

DISPLAY DEVICE

CROSS-REFERENCE TO RELATED APPLICATION

This application claims the benefit of Chinese Patent Application 201610970742.6 filed on Oct. 28, 2016 in the State Intellectual Property Office of China, the whole disclosure of which is incorporated herein by reference.

TECHNICAL FIELD

The embodiments of the present disclosure relate to a display device, and more particularly to a reflective display device or a transflective liquid crystal display device.

DESCRIPTION OF THE RELATED ART

The reflective display device may realize the display function by using ambient lights which are incident by reflection, and thus may omit a backlight source. Therefore, it is applied in more and more applications as a low power consumption display device. However, depending on the change of the ambient light intensity, the display effect of the reflective display device may vary. Especially under a condition with weak light, the reflective display device has problems of relatively low brightness, relatively low contrast, and relatively poor display effect. In addition, the transflective liquid crystal display device also suffers from the above technical problems.

SUMMARY

The embodiments of the present disclosure provide a display device, comprising a first electrode and a second electrode which are disposed oppositely and are configured to shift a bright state or a dark state of an pixel unit by changing an electric field applied between the first electrode and the second electrode; a reflection member configured to reflect an incident light toward a light-emitting side of the display device; and a reflection compensation member disposed below the reflection member in a direction of the incident light to compensate a light reflection efficiency of the reflection member, wherein the light reflection efficiency of the reflection compensation member is set to be larger when the pixel unit is in the bright state than that when the pixel unit is in the dark state.

According to an exemplary embodiment of the present disclosure, the reflection compensation member comprises an electrochromic layer, a light reflection efficiency of which varies depending on a voltage applied thereto.

According to an exemplary embodiment of the present disclosure, the electrochromic layer is an inorganic electrochromic layer, and the material thereof is an oxide of a transition metal element.

According to an exemplary embodiment of the present disclosure, the electrochromic layer is a $VO_2$ thin film having a thickness ranging between 500-1200 nm and a light reflection efficiency ranging between 95%-5%.

According to an exemplary embodiment of the present disclosure, the electrochromic layer is an organic electrochromic layer, and the material thereof is one or more selected from polythiophenes and derivatives thereof, viologens, tetrathiafulvalene, metal phthalocyanines compounds.

According to an exemplary embodiment of the present disclosure, the first electrode is an upper electrode of an electronic paper display device, the second electrode is a lower electrode of an electronic paper display device, with an electrophoretic liquid being contained between the upper electrode and the lower electrode, in which electrophoretic liquid the electrophoretic moving particles are contained; and wherein the electrophoretic moving particles are selectively moved to the upper electrode or the lower electrode depending on an electric field applied between the upper electrode and the lower electrode such that the pixel unit presents the bright state or the dark state.

According to an exemplary embodiment of the present disclosure, the reflection member comprises a plurality of hemispherical protrusions configured to protrude toward the lower electrode, the hemispherical protrusions reflecting the incident light by a total reflection thereon toward the light-emitting side of the display device; and the upper electrode is formed on a convex side of the hemispherical protrusion.

According to an exemplary embodiment of the present disclosure, the display device further comprises a cover plate disposed on a side of the reflection member facing away from the upper electrode; and a bottom plate disposed on a side of the lower electrode facing away from the upper electrode.

According to an exemplary embodiment of the present disclosure, the reflection compensation member is disposed on the upper electrode, and the reflection compensation member and the upper electrode are conductively contacted with each other so that voltages of the reflection compensation member and the upper electrode may be controlled synchronously.

According to an exemplary embodiment of the present disclosure, the upper electrode is provided with an insulating layer, the reflection compensation member is disposed on the insulation layer such that the reflection compensation member and the upper electrode are electrically insulated, and the voltages of the reflection compensation member and the upper electrode are controlled separately.

According to an exemplary embodiment of the present disclosure, the reflection compensation member serves as the upper electrode.

According to an exemplary embodiment of the present disclosure, the electrophoretic moving particles comprise particles with one type of polarity.

According to an exemplary embodiment of the present disclosure, the electrophoretic moving particles comprise particles with positive and negative polarities.

According to an exemplary embodiment of the present disclosure, the display device further comprises a light source assembly which comprises: a light guide plate disposed on a side of the reflection member facing away from the upper electrode; and a light emitting unit disposed on a lateral side of the light guide plate such that light is incident into the light guide plate from the lateral side of the light guide plate; wherein the light guide plate is configured to change a direction of incident light from the light emitting unit such that light is incident on the reflection member.

According to an exemplary embodiment of the present disclosure, the display device further comprises a cover plate disposed on a side of the light guide plate facing away from the reflection member; and a bottom plate disposed on a side of the lower electrode facing away from the upper electrode.

According to an exemplary embodiment of the present disclosure, the first electrode is a pixel electrode of an LCD display device, the second electrode is a common electrode of an LCD display device, the LCD display device further comprises liquid crystal cells that selectively transmit light and block light depending on a voltage applied between the pixel electrode and the common electrode so that the pixel cell assumes the bright state or the dark state.

BRIEF DESCRIPTION OF THE DRAWINGS

In order to make the object, features and advantages of the present disclosure clearer and easier to understand, the present disclosure will be further described below with reference to the accompanying drawings and specific embodiments.

DETAILED DESCRIPTION OF PREFERRED EMBODIMENTS

Hereinafter, embodiments of the present disclosure will be described with reference to the accompanying drawings. It should be understood, however, that these descriptions are illustrative only and not intended to limit the scope of the disclosure. In addition, in the following description, descriptions of well-known structures and techniques are omitted to avoid unnecessarily obscuring the concepts of the present disclosure.

Various structural diagrams according to embodiments of the present disclosure are shown in the drawings. The drawings are not necessarily to scale, with some details being enlarged for clarity while some other details being omitted. The various regions shown in the drawings, the shapes of the layers, and their relative sizes and positional relationships are also merely exemplary and in practice may vary due to manufacturing tolerances or technical limitations, and a person skilled in the art may design regions/layers of different shapes, sizes, relative positions additionally as desired.

In the context of the present disclosure, when a layer/element is referred to as being "on" another layer/element, the layer/element may be directly on the another layer/element or there may be a middle layer/element. In addition, if a layer/element is "on" another layer/element in one direction, the layer/element may be "under" another layer/element when being turned in an opposite direction to the original direction.

Figure 1:
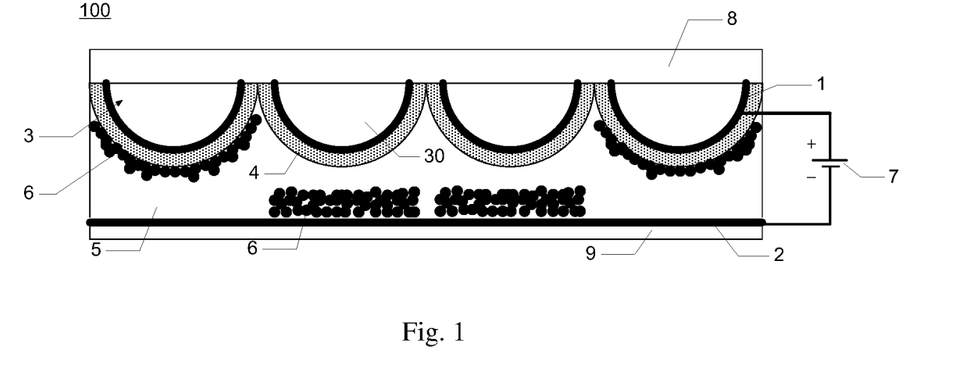
FIG. 1 is a schematic structural view of an electronic paper display device according to an embodiment of the present disclosure.
Figure 1A:
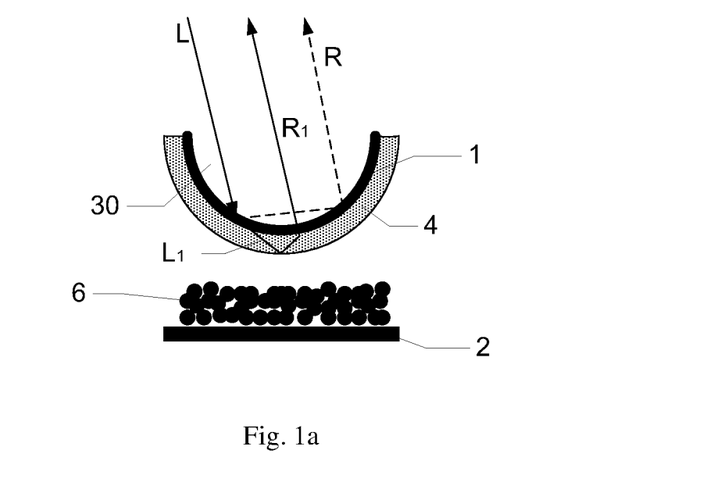
FIG. 1a is a partially enlarged schematic structural view of the electronic paper display device in FIG. 1.

FIG. 1 is a schematic structural view of an electronic paper display device according to an embodiment of the present disclosure; FIG. 1a is a partially enlarged schematic structural view of the electronic paper display device of FIG. 1. As shown in FIGS. 1 and 1a, the electronic paper display device 100 includes an upper electrode 1 and a lower electrode 2 provided opposite to each other, a reflection member 3, as well as a reflection compensation member 4. According to the embodiment as shown in FIG. 1, a bright state or a dark state of the pixel unit may be switched by changing the electric field applied between the upper electrode 1 and the lower electrode 2. The reflection member 3 is configured to reflect an incident light toward a light-emitting side (an upper side in FIG. 1) of the electronic paper display device 100 and the reflection compensation member 4 is configured to be positioned below the reflection member 3 in a direction of incident light to compensate a light reflection efficiency of the reflection member 3; furthermore, the light reflection efficiency of the reflection compensation member 4 is set to be larger when the pixel unit is in the bright state than that when the pixel unit is in the dark state. In the present application, the light reflection efficiency is defined as a ratio of the amount of reflected light to the amount of the incident light.

Specifically, in the embodiment of the electronic paper display device shown in FIG. 1, an electrophoresis liquid 5 having a relatively low refractive index is contained between the upper electrode 1 and the lower electrode 2, and electrophoretic moving particles 6 are contained in the electrophoresis liquid 5. The electrophoretic moving particles 6 are selectively moved to the upper electrode 1 or the lower electrode 2 depending on an electric field applied between the upper electrode 1 and the lower electrode 2 by a voltage source 7 so that a pixel unit presents the bright state or the dark state.

According to a specific embodiment, as shown in FIGS. 1 and 1a, the reflection member 3 includes a plurality of hemispherical protrusions 30 configured to protrude toward the lower electrode 2, and the hemispherical protrusions 30 reflect the incident light L, by total reflection thereon, towards the light-emitting side of the display device. The upper electrode 1 is formed on a convex side of each hemispherical protrusion 30. The reflection member 3 is, for example, made of glass. The upper electrode 1 is, for example, a transparent electrode such as ITO as long as it does not affect the reflection and transmission of light. According to this embodiment, each hemispherical protrusion 30 may be provided corresponding to one pixel unit. In other embodiments, multiple hemispherical protrusions 30 may be provided corresponding to one pixel unit.

In addition, in the electronic paper display device 100 shown in FIG. 1, the reflection compensation member 4 is provided on the upper electrode 1, above or below the upper electrode 1 which conductively contacts the reflection compensation member 4 so that voltages of the reflection compensation member 4 and the upper electrode 1 may be controlled synchronously. Therefore, it is advantageous to control the voltage of the reflection compensation member 4 by a driving device that controls the voltages of the upper electrode and the lower electrode of the pixel unit, thereby conveniently adjusting the voltage of the reflection compensation member 4.

According to a specific embodiment, as shown in FIG. 1, the reflective display apparatus 100 further includes a cover plate 8 disposed on a side of the reflective member 3 facing away from the upper electrode 1. The cover plate 8 may be made of a transparent glass so that the ambient light may be incident on the reflection member 3 from the upper side through the cover plate 8. The reflective display device 100 may further include a bottom plate 9 disposed on a side of the lower electrode 2 facing away from the upper electrode 1 to support the lower electrode 2. Thus, it is possible to provide an electronic paper display device 100 having a relatively high brightness and a relatively high contrast.

As shown in FIGS. 1 and 1a, for individual pixel unit, when the electrophoretic moving particles 6 are black light-absorbing particles which are attached to the lower electrode 2, the hemispherical protrusion 30 reflects the incident light L by total reflection thereon; and the reflected lights R are reflected upward to the light emitting side (here, the upper side) of the display device 100, and then received by the human eye. At this time, the pixel unit is presented in the bright state. On the contrary, when the electrophoretic moving particles 6 are attached to the upper electrode 1, the electrophoretic moving particles 6 destroy a condition of the total reflection of the hemispherical projections 30. The incident light L transmits through the hemispherical projections 30 and the upper electrode 1 and is absorbed by the electrophoretic moving particles 6. No light is reflected to the light-emitting side of the display device 100, so that the pixel unit is presented in the dark state.

In the electronic paper display device shown in FIG. 1, the electrophoretic moving particles 6 include particles with one type of polarity, for example, positive particles or negative particles. Those skilled in the art will understand that the voltages of the upper electrode and the lower electrode may be controlled depending on the polarity of electrophoretic moving particles to achieve the bright state or the dark state of the pixel unit.

As shown in FIG. 1a, when the pixel unit is in the bright state, the electrophoretic moving particles 6 are ideally attached to the bottom electrode 2. Under such a condition, the hemispherical projection 30 is in a total reflection state and the reflectivity should be 100%. The incident light L are totally reflected out as the reflected light R. However, in practice, when the electrophoretic moving particles 6 are attached to the bottom electrode 2, some of the light L1 may still transmit through the hemispherical protrusions 30 and the upper electrode 1 in the total reflection state, and thus the reflectivity cannot reach 100%. Under such a condition, for the conventional reflective display device, there is a problem that the pixel unit is not bright enough in the bright state, and the contrast of the display device is decreased. Especially in the case of weak ambient light, the display device is poorly displayed.

In contrast, according to the above-described embodiment of the present disclosure, since the reflection compensation member 4 is provided, the light reflection efficiency of the reflection member 3 is compensated by the reflection compensation member 4, and the light reflection efficiency of the reflection compensation member 4 is set to be larger when the pixel cell is in the bright state than that when the pixel cell is in the dark state. In this way, the reflection efficiency for the incident light may be increased when the pixel unit is in the bright state, and the reflection efficiency for the incident light may be reduced when the pixel unit is in the dark state, thereby not only improving the brightness of the pixel unit in the bright state, but also improving the contrast of the reflective display device and the display effect.

Specific examples of the reflection compensation member 4 may include an electrochromic layer, the light reflection efficiency of which varies depending on the voltage applied thereto. Taking the $VO_2$ electrochromic layer as an example, it manifests itself in transmitting light in the absence of a voltage, manifests itself in reflecting light under the condition of being subjected to a higher voltage, and manifests itself in transflecting a light under the condition of being subjected to an intermediate voltage. The reflectivity and transmittance to light may be adjusted depending on the voltage. Therefore, the reflection efficiency may be adjusted by changing the voltage applied to the electrochromic layer for each pixel, so that the reflection efficiency of the reflection member 3 may be selectively compensated.

Most of transition metal oxides (Group VIB, Group VIII and Group Pt) have electrochromic display functions, such as $VO_2$, $NiO$, $WO_3$, $TiO_2$. Light transmittance and/or reflectivity of the transition metal oxides will change under the action of different voltages. Therefore, the transition metal element oxide may be used as the inorganic electrochromic layer which may function as the reflection compensation member of the embodiment of the present disclosure. Taking the electrochromic layer being a $VO_2$ film for example, its thickness may be set between 500-1200 nm, and the light reflection efficiency thereof may vary from 95% to 5%. In addition, reflectivity of many rare-earth metal compounds (e.g., AgInSbTe phase-change films) may change when they change from a crystalline state to an amorphous state and may also be used as the reflectivity compensation film in the above embodiments.

According to other embodiments, the electrochromic layer may also be an organic electrochromic layer, the material of which is selected from one or more of the following materials: polythiophenes and their derivatives, viologens, tetrathiafulvalene, metal phthalocyanines compounds and the like. Under different voltages, the transmittance and/or the reflectivity of the organic electrochromic layer made of the above materials may also change.

The above are some specific examples of reflection compensation members. According to other embodiments, the reflection compensation member is not limited to the above electrochromic film. For example, in addition to the electrochromic film, there are films of photo-chromism, thermo-chromism, mechano-chromism and the like. The reflectivity of these films may also be varied depending on the setting conditions. Therefore, they may also be used as the reflective compensation member of the embodiments of the present disclosure.

Table 1 shows the numerical values of the reflection efficiency of the electronic paper display device without the reflection compensation member (electrochromic layer) 4 being provided at different upper electrode voltages as shown in FIG. 1. Among them, the voltage of the lower electrode is 0V and remains constant, the voltage of the upper electrode 1 varies between 0V and 5V. The electrophoretic moving particles 6 are negatively charged.

TABLE 1

| Voltage of Upper electrode | Reflection Efficiency |
| --- | --- |
| 0 V | 95% |
| 1 V | 80% |
| 2 V | 60% |
| 3 V | 40% |
| 4 V | 20% |
| 5 V | 5% |

Table 2 shows the numerical values of the reflection efficiencies of the electronic paper display device shown in FIG. 1 at different upper electrode voltages. Among them, the reflection compensation member 4 uses a $VO_2$ electrochromic layer, the lower electrode voltage is 5 V and remains constant, and the voltage of the upper electrode 1 varies between 0 V and 5 V. The electrophoretic moving particles 6 are positively charged. The voltages of the upper electrode and the electrochromic layer are controlled synchronously.

When the voltage of the upper electrode is 0V, electrophoretic moving particles move upward; at that time, the reflection is the weakest, and the voltage of the electrochromic layer is also 0V, resulting in that the layer doesn't have a function of reflection. When the voltage of the upper electrode is at an intermediate value for example, 3V, the electrophoretic moving particle portion moves downward. At this time, the reflection efficiency of the reflection member itself is 50%, and the voltage of the electrochromic layer is also 3V, which enhances the reflection function, and correspondingly, the reflection efficiency is thus 70%. When the voltage of the upper electrode is 5V, all of the electrophoretic moving particles move down, and the reflection state is the strongest at this time. The reflection efficiency of the reflection member itself may reach 95%, and the voltage of the electrochromic layer is also 5V, which is in a state that the reflection performance is maximized, as a result of which the overall reflection efficiency is increased up to 100%.

This case may also correspond to the case where the electrophoretic moving particle is negatively charged, the lower electrode voltage is 0V, and the upper electrode voltage varies between −5~0V.

TABLE 2

| electrochromic layer and upper electrode voltage | reflection efficiency |
|---|---|
| 0 V | 5% |
| 1 V | 33% |
| 2 V | 50% |
| 3 V | 70% |
| 4 V | 90% |
| 5 V | 100% |

In addition to improving the brightness and contrast of the display device, the electronic paper display device as shown in FIG. 1 further has the following advantages: the manufacturing process of the reflection compensation member 4 is simple and the film layer may be directly formed on the upper electrode 1 by means of evaporation, sputtering, or the like. In addition, the reflection compensation member 4 is formed over the entire light irradiation area, and may perform reflecting in the entire light irradiation area, so that the reflection effect is better. In addition, the reflection compensation member 4 may be made thin without significantly increasing the screen thickness, and the reflection compensation member 4 is formed on the upper electrode 1 which will not affect the movement of particles in a low refractive index medium and the response speed of the particles.

Although the reflection compensating member 4 and the upper electrode 1 are electrically conductively contacted in the electronic paper display device 100 shown in FIG. 1, the voltages of the reflection compensating member 4 and the upper electrode 1 may be controlled synchronously. However, the present disclosure is not limited thereto. For example, an insulating layer may be provided between the reflection compensation member 4 and the upper electrode 1 so that the voltages of the reflection compensation member 4 and the upper electrode 1 may be individually controlled.

Figure 2:
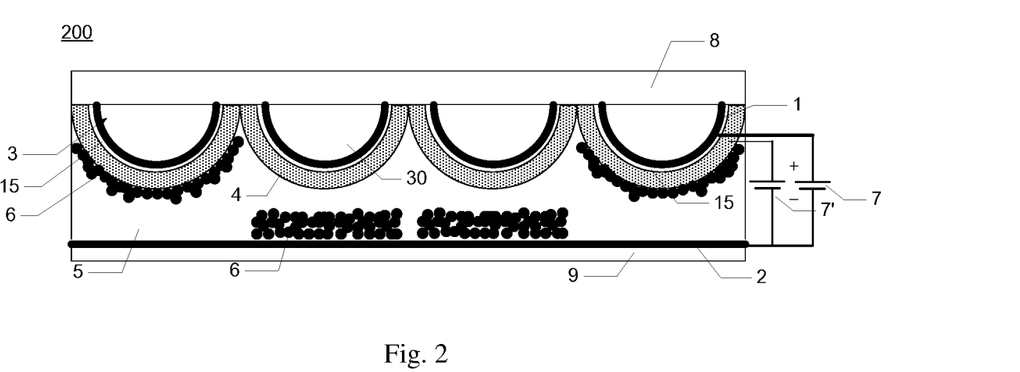
FIG. 2 is a schematic structural view of an electronic paper display device according to another embodiment of the present disclosure.

FIG. 2 shows an example of an electronic paper display device 200 provided with an insulating layer. Compared with the electronic paper display device 100 shown in FIG. 1, in the electronic paper display device 200 of FIG. 2, an insulating layer 15 is provided on the upper electrode 1, and the reflection compensating member 4 is provided on the insulating layer 15, so that the reflection compensation member 4 and the upper electrode 1 are electrically insulated from each other. The insulating layer 15 is made of a transparent material so as not to affect the reflection and transmission of light. Under this situation, the voltages applied to the upper electrode 1 and the reflection compensation member 4 may be controlled by the voltage sources 7 and 7', respectively. Accordingly, a separate driving device may be provided for controlling the voltage of the reflection compensation member 4. In this way, the voltages of the reflection compensation member 4 and the upper electrode 1 may be separately adjusted. In particular, the voltage of the reflection compensation member 4 may be adjusted separately, so that the reflection efficiency of the reflection compensation member 4 for the incident light may be increased when the pixel unit is in the bright state, while the reflection efficiency of the reflection compensation member 4 for the incident light may be reduced when the pixel unit is in the dark state, regardless of the voltage of the upper electrode 1. Accordingly, the voltage of the reflection compensation member 4 may be set more conveniently so as to selectively compensate the reflection efficiency of the reflection member 3.

The other aspects of the electronic paper display device 200 according to this embodiment are the same as those of the electronic paper display device 100 shown in FIG. 1.

Table 3 shows the numerical values of the reflection efficiencies of the reflective display apparatus 200 shown in FIG. 2 with different upper electrode voltages and different electrochromic layer voltages. Here, the electrochromic layer is $VO_2$. The lower electrode voltage is 0V which remains constant. The upper electrode voltage varies between 0V and 5V, and the electrochromic layer voltage also varies between 0V and 5V. Electrophoresis moving particles 6 is charged negatively.

TABLE 3

| Voltage of Electrode | Voltage of Electrochromic Layer | | | | | |
|---|---|---|---|---|---|---|
| | 0 V | 1 V | 2 V | 3 V | 4 V | 5 V |
| 0 V | 95% | 96% | 97% | 98% | 99% | 100% |
| 1 V | 80% | 83% | 85% | 88% | 90% | 93% |
| 2 V | 60% | 63% | 67% | 70% | 74% | 77% |
| 3 V | 40% | 43% | 47% | 50% | 54% | 57% |
| 4 V | 20% | 33% | 35% | 38% | 40% | 43% |
| 5 V | 5% | 8% | 10% | 13% | 15% | 18% |

As can be seen from Table 3, after the electrochromic layer is added, the reflective efficiency of the display device under the same upper electrode voltage increases to some extent as the voltage of the electrochromic layer increases. In particular, the reflection efficiency may reach 100% when the upper electrode voltage is 0V and the voltage of the electrochromic layer is 5V. Therefore, the electronic paper display device 200 according to this embodiment may also achieve an effect of improving brightness and contrast.

In addition, compared with the electronic paper display device without an electrochromic layer, the grayscale value that may be controlled is smaller when the electrochromic layer is used. The grayscale value that may be controlled increases once the electrochromic layer is used.

Figure 3:
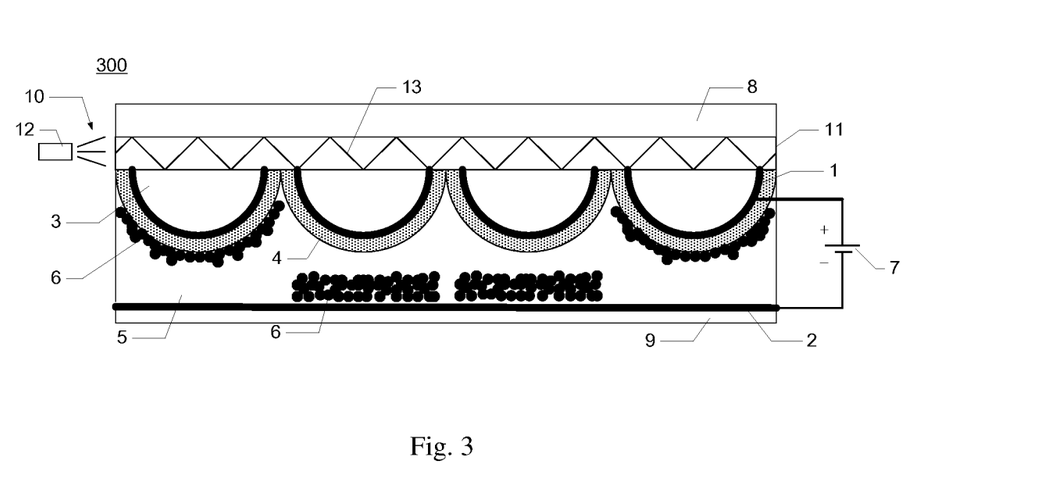
FIG. 3 is a schematic structural view of an electronic paper display device according to another embodiment of the present disclosure.

FIG. 3 is a schematic structural diagram of an electronic paper display device 300 according to another embodiment of the present disclosure. The electronic paper display device 300 shown in FIG. 3 is similar in structure to the electronic paper display device 100 shown in FIG. 1, except that the electronic paper display device 300 shown in FIG. 3 further includes a light source assembly 10. The light source assembly 10 includes a light guide plate 11 disposed on a side of the reflective member 3 facing away from the upper electrode 1 and a light emitting unit 12 disposed on a lateral side of the light guide plate 11 so that light is incident into the light guide plate 11 from the lateral side of the light guide plate 11. According to this embodiment, the light guide plate 11 is configured to change the direction of incident light from the light emitting unit 12 so that the light may be incident on the upper side of the reflection member 3 substantially perpendicularly. A person skilled in the art may set a specific structure of the light guide plate 11 as required. For example, the light guide plate 11 may include an embedded reflection element or an air bag 13 to change the light direction. In this embodiment, the cover plate 8 may be disposed on a side of the light guide plate 11 facing away from the reflective member 3; and the bottom plate 9 may be disposed on a side of the lower electrode 2 facing away from the upper electrode 1.

According to this embodiment, since the light source assembly is provided, the electronic paper display device 300 may be normally displayed even with poor ambient light or no ambient light, and has a relatively high brightness and a relatively high contrast.

Figure 4:
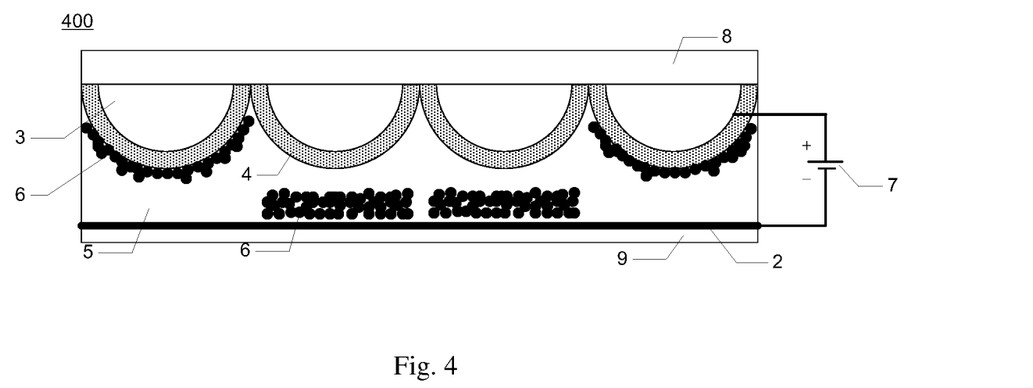
FIG. 4 is a schematic structural view of an electronic paper display device according to another embodiment of the present disclosure.

FIG. 4 is a schematic structural diagram of an electronic paper display device 400 according to another embodiment of the present disclosure. The electronic paper display device 400 shown in FIG. 4 is similar in structure to the electronic paper display device 100 shown in FIG. 1, except that in the electronic paper display device 400 shown in FIG. 4, the reflection compensation member 4 and the upper electrode 1 are integrated to be one single component, that is, the reflection compensation member 4 itself serves as the upper electrode. In this case, the manufacturing process of the electronic paper display device may be simplified and the thickness of the display device may be reduced. The electronic paper display device 400 according to this embodiment may also achieve the effect of improving brightness and contrast.

Table 4 shows values of reflection efficiencies of the electronic paper display device 400 at different upper electrode voltages (i.e., voltage of the electrochromic layer) as shown in FIG. 4. Among them, the electrochromic layer is $VO_2$. The lower electrode voltage is 5V and remains unchanged. The voltage of the upper electrode (electrochromic layer) varies between 0V and 5V. Electrophoresis moving particles 6 are positively charged.

TABLE 4

| Voltage of Upper electrode | Reflection Efficiency |
| --- | --- |
| 0 V | 5% |
| 1 V | 33% |
| 2 V | 50% |
| 3 V | 70% |
| 4 V | 90% |
| 5 V | 100% |

Table 4 corresponds to a reflective structure in which the electrochromic layer is used as the upper electrode. When the voltage of the upper electrode (electrochromic layer) is 0V, all the electrophoretic particles move up, the electrochromic layer may not achieve the function of increasing the reflection efficiency, and the reflection efficiency is 5%. When the voltage of the upper electrode is 3V, some of the electrophoretic moving particles move up while some other of the electrophoretic moving particles move down. The reflection efficiency of the electrochromic layer is increased to a certain extent, and the reflection efficiency is 70%. When the voltage of the upper electrode is 5V, the particles all move down, the electrochromic layer has the strongest reflection effect, and the reflection efficiency is 100%.

This situation may also correspond to the case in which the electrophoretic moving particles are charged negatively, the lower electrode voltage is 0V and the upper electrode voltage is between −5V to 0V situation.

In the embodiment of the electronic paper display device shown in FIGS. 1, 2, 3 and 4, the electrophoretic moving particles 6 comprise particles with one polarity, for example negatively charged or positively charged particles. The electrophoretic moving particles 6 are moved up and down by controlling the polarity of the upper and lower electrodes, so as to change the bright or dark state of the pixel unit. However, the present disclosure is not limited thereto.

Figure 5:
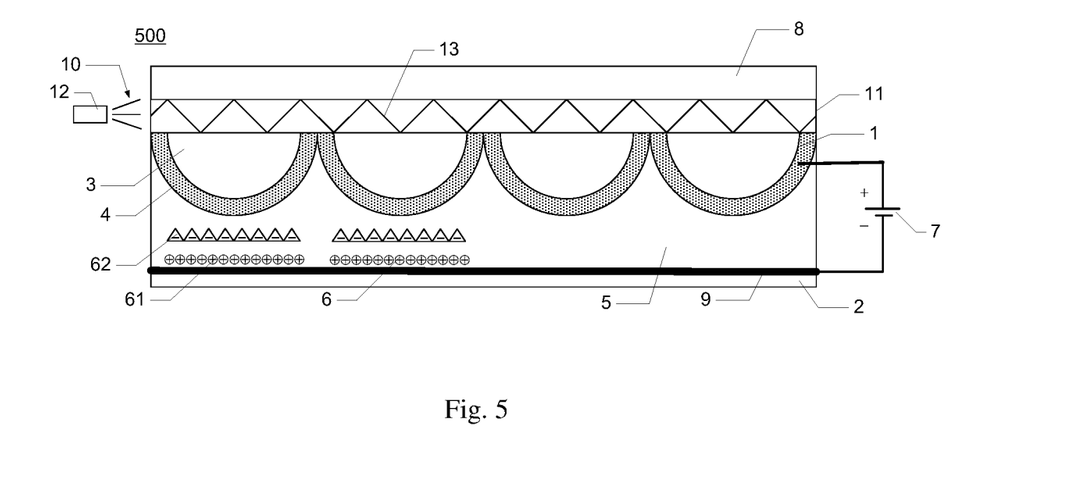
FIG. 5 is a schematic structural view of an electronic paper display device according to another embodiment of the present disclosure.

FIG. 5 is a schematic structural diagram of an electronic paper display device 500 according to another embodiment of the present disclosure. The electronic paper display device 500 shown in FIG. 5 is similar in structure to the electronic paper display device shown in FIG. 3 or 4 except that in the electronic paper display device 500 shown in FIG. 5, the electrophoretic moving particles 6 include particles with positive polarities and particles with positive negative polarities, i.e., positively charged particles 61 and negatively charged particles 62. Further, particles with the two polarities are white colored and black colored, respectively. Thus, when changing the polarity of the upper and lower electrodes, the positively charged particles 61 and the negatively charged particles 62 are respectively moved in opposite directions to change the bright or dark state of the pixel unit. The electronic paper display device 500 according to this embodiment may also achieve the effect of improving brightness and contrast.

Although some specific examples of the structure of the electronic paper display device are shown in FIGS. 1-5, the structure of the electronic paper display device is not limited to the structure of the above embodiment, but may have any other structure capable of displaying the electronic paper. As long as the concept of the reflection compensation member of the present disclosure is applied, the effects of the above-described embodiments may also be achieved.

In addition, although several embodiments of the display device of the present disclosure have been described above taking an electronic paper display device as an example, However, according to the general idea of the present disclosure, the reflective display device of the present disclosure is not limited to the electronic paper display device but may be applied to any display device that may realize the display function with reflected light. The following is an explanation of an embodiment in which the present disclosure is applied to a liquid crystal display device.

Figure 6:
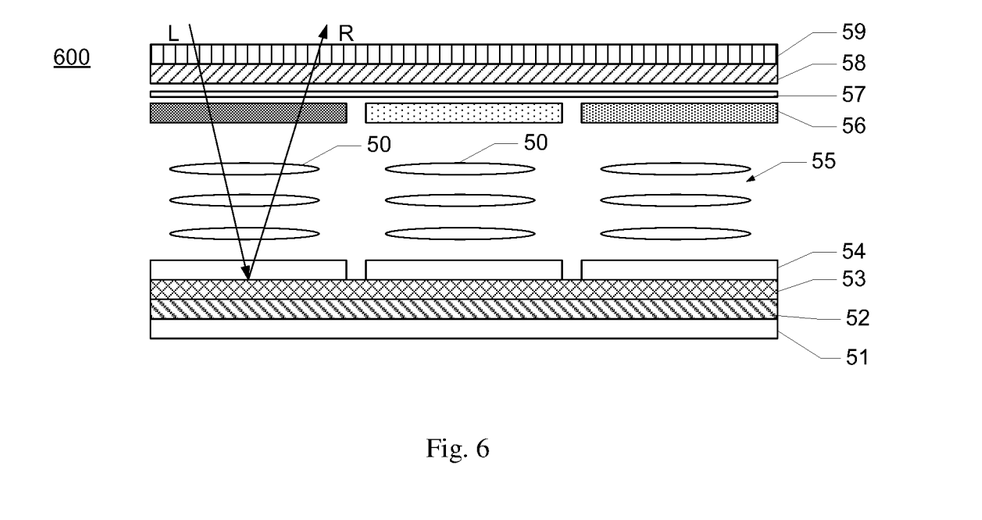
FIG. 6 is a schematic structural view of a reflective liquid crystal display device according to one embodiment of the present disclosure.

FIG. 6 is a schematic structural view of a reflective liquid crystal display device 600 according to one embodiment of the present disclosure. As shown in FIG. 6, the reflective liquid crystal display device 600 includes an array substrate 51, an electrochromic layer (reflection compensation member) 52, a reflective layer 53, a pixel electrode layer (first electrode) 54, a liquid crystal layer 55, a color filter layer 56, a common electrode layer (second electrode) 57, a quarter wave plate 58, and a polarizing plate 59 which are stacked sequentially.

The ambient light or the incident light L emitted from the external light source enters the liquid crystal display device 600 from the display side (the upper side in the figure) of the liquid crystal display device 600 and passes through the polarizing film 59, the quarter wave plate 58, the common electrode layer (the second electrode) 57, the color filter layer 56, the liquid crystal layer 55 and the pixel electrode layer 54 and reaches the reflective layer 53, and then is reflected upward through the reflective layer 53 and the electrochromic layer 52 as the reflected light R. The liquid crystal layer 55 includes a plurality of liquid crystal cells 50. When the reflected light R passes through the respective liquid crystal molecules in the liquid crystal cell 50, the liquid crystal molecules may selectively transmit and block the light according to the voltage applied between the pixel electrode 54 and the common electrode 57, so that the pixel unit presents the bright state or the dark state.

In the reflective liquid crystal display device 600 according to this embodiment, the electrochromic layer 52 is provided under the reflective layer 53. Similar to the electronic paper display device, the light reflection efficiency of the electrochromic layer 52 may be varied according to the voltage applied thereto, so as to compensate for the reflection efficiency of the reflection layer 53. Specifically, the electrochromic layer 52 has a relatively high reflection efficiency when the pixel unit is in the bright state, and the electrochromic layer 52 has a relatively low reflection efficiency when the pixel unit is in the dark state. Thus, the reflective liquid crystal display device 500 according to this embodiment also has a relatively high display brightness and a relatively high contrast.

Figure 7:
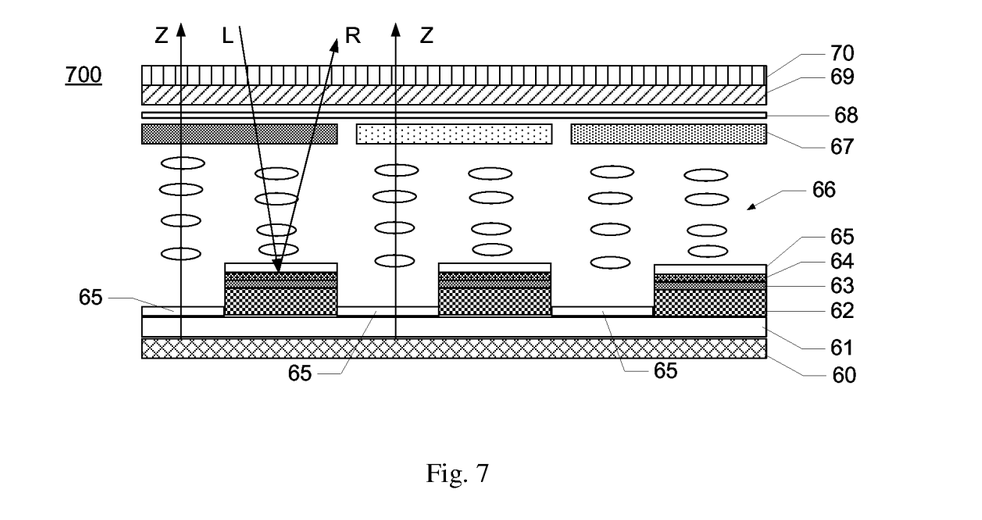
FIG. 7 is a schematic structural view of a transflective liquid crystal display device according to another embodiment of the present disclosure.

FIG. 7 is a schematic structural view of a transflective liquid crystal display device 700 according to another embodiment of the present disclosure. As shown in FIG. 7, the transflective liquid crystal display device 700 includes a backlight module 60, an array substrate 61, a cushion layer 62, an electrochromic layer (reflection compensation member) 63, a reflective layer 64, a pixel electrode layer (a first electrode) 65, a liquid crystal layer 66, a color filter layer 67, a common electrode layer (a second electrode) 68, a quarter wave plate 69, and a polarizing plate 70 which are stacked sequentially.

The structure of the transflective liquid crystal display (LCD) device 700 shown in FIG. 7 is similar to that of the reflective liquid crystal display device 600 shown in FIG. 6, except that the transflective LCD device 700 has a backlight module 60. Meanwhile, the reflective layer 64 and the electrochromic layer 63 are discretely disposed on the partial pixel electrode 65. Thus, the light Z emitted from the backlight module 60 in the pixel unit without the reflective layer 64 and the electrochromic layer 63 is transmitted to the display side for transmission display. On the other hand, in the pixel unit provided with the reflective layer 64 and the electrochromic layer 63, the ambient light or the incident light L emitted by the external light source reaches the reflection layer 64 and is reflected upward to the display side through the reflection layer 64 and the electrochromic layer 63 as the reflection light R, so as to achieve the reflective display. It is understood by those skilled in the art that the transflective liquid crystal display device 700 according to this embodiment also has the effect of improving the display brightness and contrast.

As described above, the above embodiments of the present disclosure provide a display device including a first electrode and a second electrode that are disposed opposite to each other and are configured to change the bright state and the dark state of the pixel unit by changing the electric field applied between the first electrode and the second electrode; a reflection member configured to reflect the incident light toward a light-emitting side of the display device; and a reflection compensation member disposed below the reflection member in a direction of the incident light, so as to compensate for the light reflection efficiency of the reflection member. The light reflection efficiency of the reflection compensation member is set to be larger when the pixel unit is in a bright state than that when the pixel unit is in a dark state.

The display device according to each embodiment of the present disclosure compensates the light reflection efficiency of the reflection member by the reflection compensation member, and the light reflection efficiency of the reflection compensation member is set to be larger when the pixel unit is in the bright state than that when the pixel unit is in the dark state. Therefore, the brightness and/or contrast of the display device may be increased; in addition, an adjustment range of the brightness of the display device is also increased.

The above-mentioned embodiments merely illustrate the principle and configuration of the present disclosure by way of example, and do not limit the present disclosure. Those skilled in the art should understand that any modifications and improvement to the present disclosure are within the scope of the present disclosure without departing from the general concept of the present disclosure. The protection scope of the present invention should be within the scope defined by the claims of the present application.

What is claimed is:

1. A display device, comprising a plurality of pixel units, wherein each pixel unit comprises:
   a first electrode and a second electrode which are disposed oppositely and are configured to shift a bright state or a dark state of a pixel unit by changing an electric field applied between the first electrode and the second electrode;
   a reflection member configured to reflect an incident light toward a light-emitting side of the display device;
   a reflection compensation member disposed below the reflection member in a direction of the incident light to compensate a light reflection efficiency of the reflection member, wherein the light reflection efficiency of the reflection compensation member is set to be larger when the pixel unit is in the bright state than when the pixel unit is in the dark state, and
   an electrophoretic liquid contained between the first electrode and the second electrode,
   wherein the reflection compensation member of each pixel unit comprises an electrochromic layer, a light reflection efficiency of which varies depending on a voltage applied thereto, so as to individually compensate the light reflection efficiency of the reflection member of each pixel unit.

2. The display device according to claim 1, wherein the electrochromic layer is an inorganic electrochromic layer, and the material thereof is an oxide of a transition metal element.

3. The display device according to claim 2, wherein the electrochromic layer is a $VO_2$ thin film having a thickness ranging between 500-1200 nm and a light reflection efficiency ranging between 95%-5%.

4. The display device according to claim 1, wherein the electrochromic layer is an organic electrochromic layer, and the material thereof is one or more selected from polythiophenes and derivatives thereof, viologens, tetrathiafulvalene, and metal phthalocyanines compounds.

5. The display device according to claim 1,
wherein the first electrode is an upper electrode of an electronic paper display device, and the second electrode is a lower electrode of the electronic paper display device,
wherein electrophoretic moving particles are contained in the electrophoretic liquid; and
wherein the electrophoretic moving particles are selectively moved to the upper electrode or the lower electrode depending on an electric field applied between the upper electrode and the lower electrode such that the pixel unit presents the bright state or the dark state.

6. The display device according to claim 5, wherein the reflection member comprises a plurality of hemispherical protrusions configured to protrude toward the lower electrode, the hemispherical protrusions reflecting the incident light by a total reflection thereon toward the light-emitting side of the display device; and
the upper electrode is formed on a convex side of the hemispherical protrusions.

7. The display device according to claim 6, further comprising
a cover plate disposed on a side of the reflection member facing away from the upper electrode; and
a bottom plate disposed on a side of the lower electrode facing away from the upper electrode.

8. The display device according to claim 6, wherein the reflection compensation member is disposed on the upper electrode, and the reflection compensation member and the upper electrode are conductively contacted with each other so that voltages of the reflection compensation member and the upper electrode are controlled synchronously.

9. The display device according to claim 6, wherein the upper electrode is provided with an insulating layer, the reflection compensation member is disposed on the insulation layer such that the reflection compensation member and the upper electrode are electrically insulated, and the voltages of the reflection compensation member and the upper electrode are controlled separately.

10. The display device according to claim 6, wherein the reflection compensation member serves as the upper electrode.

11. The display device according to claim 6, further comprising a light source assembly which comprises:
a light guide plate disposed on a side of the reflection member facing away from the upper electrode; and
a light emitting unit disposed on a lateral side of the light guide plate such that light is incident into the light guide plate from the lateral side of the light guide plate;
wherein the light guide plate is configured to change a direction of incident light from the light emitting unit such that light is incident on the reflection member.

12. The display device according to claim 11, further comprising
a cover plate disposed on a side of the light guide plate facing away from the reflection member; and
a bottom plate disposed on a side of the lower electrode facing away from the upper electrode.

13. The display device according to claim 5, wherein the electrophoretic moving particles comprise particles with one type of polarity.

14. The display device according to claim 5, wherein the electrophoretic moving particles comprise particles having positive polarities and particles having negative polarities.

15. The display device according to claim 1, wherein the first electrode is a pixel electrode of an LCD display device, and the second electrode is a common electrode of the LCD display device, and
the LCD display device further comprises liquid crystal cells that selectively transmit light and block light depending on a voltage applied between the pixel electrode and the common electrode so that the pixel cell assumes the bright state or the dark state.

* * * * *